United States Patent
He et al.

(10) Patent No.: US 12,246,747 B2
(45) Date of Patent: Mar. 11, 2025

(54) ADAPTIVE AND FUEL EFFICIENT PLANNING AND CONTROL

(71) Applicant: PlusAI, Inc., Santa Clara, CA (US)

(72) Inventors: Chaozhe He, Clarence Center, NY (US); Xiaoyu Huang, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/204,216

(22) Filed: May 31, 2023

(65) Prior Publication Data
US 2024/0400086 A1    Dec. 5, 2024

(51) Int. Cl.
*B60W 60/00* (2020.01)
*B60W 40/105* (2012.01)
*B60W 50/06* (2006.01)

(52) U.S. Cl.
CPC ........ *B60W 60/001* (2020.02); *B60W 40/105* (2013.01); *B60W 50/06* (2013.01); *B60W 2520/00* (2013.01)

(58) Field of Classification Search
CPC .. B60W 60/001; B60W 40/105; B60W 50/06; B60W 2520/00; G05D 1/00; G01C 21/00; G08G 1/00
See application file for complete search history.

(56) References Cited

U.S. PATENT DOCUMENTS

| | | | |
|---|---|---|---|
| 8,700,256 B2 * | 4/2014 | Duraiswamy | B60W 50/0097 701/34.2 |
| 8,744,718 B2 * | 6/2014 | Johansson | B60K 31/00 340/988 |
| 10,495,493 B2 * | 12/2019 | Reed | G01S 7/4026 |
| 10,717,440 B2 * | 7/2020 | Sharma | B60W 10/02 |
| 11,247,564 B2 * | 2/2022 | Koebler | G08G 1/0112 |
| 11,565,699 B1 * | 1/2023 | Ravella | B60W 60/0023 |
| 11,618,460 B1 * | 4/2023 | Seo | B60W 60/0027 701/301 |
| 11,655,893 B1 * | 5/2023 | Pertsel | F16H 59/44 701/59 |
| 11,834,066 B2 * | 12/2023 | Suplin | B60W 50/0098 |
| 11,987,247 B2 * | 5/2024 | Seo | B60W 30/18072 |
| 12,077,181 B1 * | 9/2024 | Costantino | B60W 60/0011 |

(Continued)

FOREIGN PATENT DOCUMENTS

| | | | |
|---|---|---|---|
| DE | 10129149 B4 * | 7/2022 | ........ B60K 31/0058 |
| DE | 102022100664 A1 * | 7/2023 | |

(Continued)

OTHER PUBLICATIONS

DE10129149B4 English translation (Year: 2001).*

(Continued)

*Primary Examiner* — Angelina M Shudy
(74) *Attorney, Agent, or Firm* — Sheppard Mullin Richter & Hampton LLP

(57) ABSTRACT

Methods, systems, and non-transitory computer-readable media are configured to perform operations comprising determining parameters for an environment based on a regenerable elevation index; generating a speed profile for the environment based on the parameters; and generating control actions for control of a vehicle in the environment based on the speed profile.

20 Claims, 10 Drawing Sheets

(56) References Cited

U.S. PATENT DOCUMENTS

| | | | | |
|---|---|---|---|---|
| 2004/0201672 A1* | 10/2004 | Varadarajan | ............ | H04N 7/183 348/54 |
| 2005/0143895 A1* | 6/2005 | Kato | ................. | B60W 30/16 180/170 |
| 2010/0268432 A1* | 10/2010 | Arai | ................. | B60W 40/072 701/96 |
| 2011/0112720 A1* | 5/2011 | Keep | ................. | B60R 16/02 340/500 |
| 2012/0083943 A1* | 4/2012 | Johansson | ............ | B60W 10/06 701/1 |
| 2012/0083984 A1* | 4/2012 | Johansson | ............ | B60W 10/06 701/1 |
| 2012/0083985 A1* | 4/2012 | Johansson | ............ | B60W 40/06 701/93 |
| 2013/0096792 A1* | 4/2013 | Maier | ................. | B60W 40/105 701/1 |
| 2013/0297174 A1* | 11/2013 | Lacaze | ............ | B60W 30/143 701/94 |
| 2013/0332402 A1* | 12/2013 | Rakshit | ............ | B60W 50/14 706/46 |
| 2014/0074370 A1* | 3/2014 | Johansson | ............ | B60K 31/00 701/93 |
| 2014/0074371 A1* | 3/2014 | Johansson | ............ | B60W 30/143 701/93 |
| 2014/0121889 A1* | 5/2014 | Sodergren | ............ | G06F 30/20 703/2 |
| 2014/0277835 A1* | 9/2014 | Filev | ............ | G01C 21/3469 701/2 |
| 2014/0343818 A1* | 11/2014 | Johansson | ............ | G05B 13/048 701/94 |
| 2014/0350819 A1* | 11/2014 | Johansson | ............ | G05B 13/048 701/93 |
| 2015/0210281 A1* | 7/2015 | Johansson | ............ | B60K 31/00 701/94 |
| 2015/0224992 A1* | 8/2015 | Dornieden | ............ | B60W 30/143 701/1 |
| 2015/0232099 A1* | 8/2015 | Miller | ................. | B60W 30/181 701/70 |
| 2015/0323648 A1* | 11/2015 | Haglund | ............ | G01S 17/06 701/4 |
| 2016/0096527 A1* | 4/2016 | D'Amato | ............ | B60W 10/00 701/102 |
| 2016/0297435 A1* | 10/2016 | D'Amato | ............ | B60W 30/143 |
| 2016/0339799 A1* | 11/2016 | Hellgren | ............ | B60L 58/13 |
| 2017/0015212 A1* | 1/2017 | Mitsuoka | ............ | B60L 7/14 |
| 2017/0021730 A1* | 1/2017 | Ogawa | ............ | B60L 7/18 |
| 2017/0021823 A1* | 1/2017 | Ogawa | ............ | B60L 15/20 |
| 2017/0036543 A1* | 2/2017 | Tschanz | ............ | B60W 50/0097 |
| 2017/0080931 A1* | 3/2017 | D'Amato | ............ | F16H 61/0213 |
| 2017/0151951 A1* | 6/2017 | Jeon | ............ | B60W 10/02 |
| 2018/0143647 A1* | 5/2018 | Wang | ............ | G01S 7/4808 |
| 2018/0174485 A1* | 6/2018 | Stankoulov | ............ | G09B 19/167 |
| 2018/0222483 A1* | 8/2018 | Yoon | ............ | B60W 30/143 |
| 2018/0237017 A1* | 8/2018 | Leon | ............ | B60T 7/18 |
| 2018/0265090 A1* | 9/2018 | Sharma | ............ | B60W 50/06 |
| 2018/0356830 A1* | 12/2018 | Haghighat | ............ | B60W 50/085 |
| 2018/0356835 A1* | 12/2018 | Gehring | ............ | G08G 1/22 |
| 2019/0001984 A1* | 1/2019 | Huh | ............ | B60W 10/08 |
| 2019/0025857 A1* | 1/2019 | Luckevich | ............ | G05D 1/0295 |
| 2019/0100208 A1* | 4/2019 | Plianos | ............ | F02D 29/02 |
| 2019/0100209 A1* | 4/2019 | Plianos | ............ | B60K 31/00 |
| 2019/0153970 A1* | 5/2019 | Gelso | ............ | F02D 41/1406 |
| 2019/0161082 A1* | 5/2019 | Fairgrieve | ............ | B60W 50/0097 |
| 2019/0180502 A1* | 6/2019 | England | ............ | G01S 7/417 |
| 2019/0186561 A1* | 6/2019 | Follen | ............ | F16D 48/06 |
| 2019/0286168 A1* | 9/2019 | Weiss | ............ | B64G 1/26 |
| 2019/0295412 A1* | 9/2019 | Grubwinkler | ............ | G08G 1/0141 |
| 2019/0355245 A1* | 11/2019 | Gigengack | ............ | G08G 1/0112 |
| 2019/0375394 A1* | 12/2019 | Maleki | ............ | B60W 20/11 |
| 2019/0375403 A1* | 12/2019 | Hu | ............ | B60W 30/165 |
| 2019/0375407 A1* | 12/2019 | Maleki | ............ | B60W 30/14 |
| 2019/0375421 A1* | 12/2019 | Asher | ............ | B60W 20/10 |
| 2019/0378041 A1* | 12/2019 | Dhansri | ............ | G06N 7/01 |
| 2020/0139954 A1* | 5/2020 | Wallstedt | ............ | G06F 16/29 |
| 2020/0164745 A1* | 5/2020 | Mohan | ............ | F02D 29/02 |
| 2020/0173802 A1* | 6/2020 | Thunga Gopal | ... | G01C 21/3492 |
| 2020/0191069 A1* | 6/2020 | Naidu | ............ | F02D 41/2451 |
| 2020/0284883 A1* | 9/2020 | Ferreira | ............ | G01S 7/4816 |
| 2021/0070299 A1* | 3/2021 | Dempsey | ............ | B60W 50/0097 |
| 2021/0089030 A1* | 3/2021 | Mehdi | ............ | B60W 50/00 |
| 2021/0122394 A1* | 4/2021 | Lee | ............ | B60W 30/18 |
| 2021/0163000 A1* | 6/2021 | Dieckmann | ............ | G01S 13/70 |
| 2021/0213948 A1* | 7/2021 | Lahti | ............ | G05D 1/0293 |
| 2021/0237717 A1* | 8/2021 | Zhang | ............ | G06N 3/08 |
| 2021/0253097 A1* | 8/2021 | Lacaze | ............ | B60W 40/105 |
| 2021/0287393 A1* | 9/2021 | Warnaar | ............ | H04N 13/111 |
| 2021/0318691 A1* | 10/2021 | Amini | ............ | G05D 1/0278 |
| 2021/0334630 A1* | 10/2021 | Lambert | ............ | G06N 3/047 |
| 2021/0403034 A1* | 12/2021 | Lapin | ............ | B60W 50/0098 |
| 2022/0024441 A1* | 1/2022 | Jun | ............ | B60K 6/24 |
| 2022/0105934 A1* | 4/2022 | Shieh | ............ | B60W 40/1005 |
| 2022/0144241 A1* | 5/2022 | Ortmann | ............ | B60W 10/08 |
| 2022/0171398 A1* | 6/2022 | Grossman | ............ | B60W 50/14 |
| 2022/0215603 A1* | 7/2022 | Goldman | ............ | G01C 21/28 |
| 2022/0219691 A1* | 7/2022 | Maleki | ............ | G06F 11/079 |
| 2022/0250641 A1* | 8/2022 | Seegmiller | ............ | G01C 21/3407 |
| 2022/0398873 A1* | 12/2022 | Canova | ............ | G01C 21/26 |
| 2022/0402487 A1* | 12/2022 | He | ............ | B60W 30/16 |
| 2023/0019462 A1* | 1/2023 | Busse | ............ | B60W 60/0011 |
| 2023/0047444 A1* | 2/2023 | Henderson | ............ | B60T 8/175 |
| 2023/0080281 A1* | 3/2023 | Kundu | ............ | G01C 21/3469 701/410 |
| 2023/0096493 A1* | 3/2023 | Alamdari Sajadi | .. | B62D 15/025 701/41 |
| 2023/0139003 A1* | 5/2023 | Bhasme | ............ | B60L 15/2045 701/533 |
| 2023/0150502 A1* | 5/2023 | Dickson | ............ | B60W 50/14 701/95 |
| 2023/0234596 A1* | 7/2023 | Woo | ............ | B60W 10/18 701/41 |
| 2023/0242111 A1* | 8/2023 | Aggoune | ............ | B60W 50/0097 701/22 |
| 2023/0250784 A1* | 8/2023 | Zhao | ............ | F02N 11/0803 701/102 |
| 2023/0391328 A1* | 12/2023 | Van Koutrik | ..... | B60W 50/0097 |
| 2023/0406309 A1* | 12/2023 | Seo | ............ | B60W 30/18163 |
| 2024/0001928 A1* | 1/2024 | Ghandriz | ............ | B62D 53/0864 |
| 2024/0059317 A1* | 2/2024 | Quirynen | ............ | B60W 10/18 |
| 2024/0123990 A1* | 4/2024 | Follen | ............ | B60W 30/18072 |
| 2024/0161009 A1* | 5/2024 | Nakaguchi | ............ | G06N 20/00 |

FOREIGN PATENT DOCUMENTS

| | | | | |
|---|---|---|---|---|
| DE | 102022120113 A1 * | 7/2023 | ............ | B60W 10/08 |
| EP | 1777135 A1 * | 4/2007 | ............ | B60W 30/16 |
| WO | WO-2024022141 A1 * | 2/2024 | | |

OTHER PUBLICATIONS

Vajedi, Mahyar, and Nasser L. Azad. "Ecological adaptive cruise controller for plug-in hybrid electric vehicles using nonlinear model predictive control." IEEE Transactions on Intelligent Transportation Systems 17.1 (2015): 113-122. (Year: 2015).*

WO-2024022141-A1 English translation (Year: 2024).*

DE-102022120113-A1 machine translation (Year: 2023).*

DE-102022100664-A1 machine translation (Year: 2023).*

EP-1777135-A1 machine translation (Year: 2007).*

* cited by examiner

ADAPTIVE AND FUEL EFFICIENT PLANNING AND CONTROL

FIELD OF THE INVENTION

The present technology relates to autonomous systems. More particularly, the present technology relates to adaptive and fuel efficient planning and control in autonomous systems.

BACKGROUND

An autonomous system for navigation of a vehicle can plan and control motion for the vehicle. The planning and control functions of the autonomous system rely on data about the vehicle and an environment in which the vehicle is travelling, including the position and movement of other vehicles and obstacles. The performance of the planning and control functions can depend on such data as the state of the vehicle and the conditions of the environment change. The performance of these functions can be especially challenging in different situations. As one example, a vehicle, such as a truck, that is travelling on a road should properly account for changes in elevation in the road to travel at an efficient and safe speed.

SUMMARY

Various embodiments of the present technology can include methods, systems, and non-transitory computer readable media configured to perform operations comprising determining parameters for an environment based on a regenerable elevation index; generating a speed profile for the environment based on the parameters; and generating control actions for control of a vehicle in the environment based on the speed profile.

In some embodiments, the parameters include a horizon length and a speed range, wherein the horizon length provides a distance ahead of the vehicle, and wherein the speed range provides a lower speed limit and an upper speed limit.

In some embodiments, the speed profile is generated based on vehicle dynamics for the vehicle and real-time inputs, wherein the vehicle dynamics include at least one of: a vehicle body model of the vehicle, a powertrain model of the vehicle, longitudinal dynamics associated with the vehicle, and an energy efficiency map for the vehicle, and wherein the real-time inputs include at least one of: a speed of the vehicle, an acceleration of the vehicle, a brake condition of the vehicle, a location of the vehicle, a direction of the vehicle, a pose of the vehicle, and an elevation of the vehicle.

In some embodiments, the speed profile includes a set of target speeds and a set of target positions associated with the set of target speeds, and wherein the control actions are generated based on a first target speed of the set of target speeds and a first target position of the set of target positions.

In some embodiments, the determining the parameters for the environment comprises providing a set of parameters and metrics for the environment to a machine learning model; determining a set of regenerable elevation indexes for the set of parameters based on the machine learning model; and determining the parameters of the set of parameters associated with the highest regenerable elevation index of the set of regenerable elevation indexes.

In some embodiments, the machine learning model is trained based on simulations of vehicle performance in environments and fuel economy performance improvements determined based on the simulations.

In some embodiments, the operations further comprise providing the parameters associated with the highest regenerable elevation index as an input of an input-output pair for training; and providing fuel economy performance improvements determined based on performance of the vehicle as associated with an output of the input-output pair.

In some embodiments, the metrics for the environment include at least one of: elevations in the environment, a number of downhill portions in the environment, lengths of the downhill portions in the environment, a number of uphill portions in the environment, and lengths of the uphill portions in the environment.

In some embodiments, the control actions include at least one of: coasting, application of foundation brakes, application of engine brakes, application of gear shift, and application of regenerative brakes.

In some embodiments, the operations further comprise generating an updated speed profile based on at least one of: updated parameters, updated vehicle dynamics, and updated real-time inputs.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
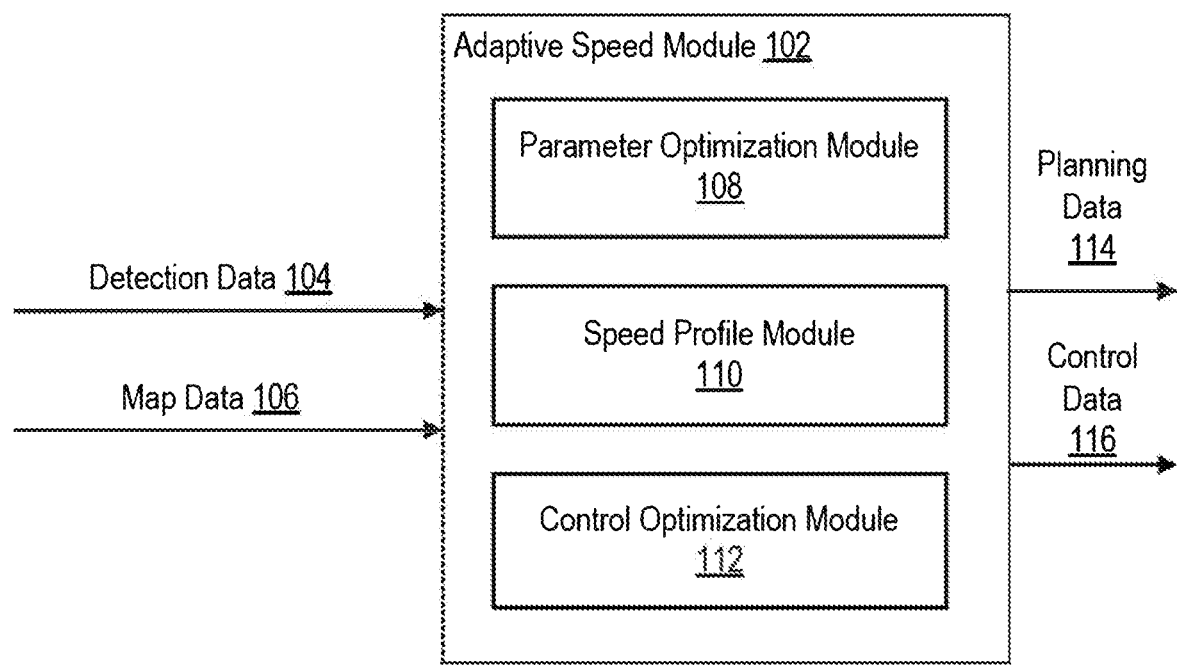
FIG. 1 illustrates an example system associated with adaptive and fuel efficient planning and control, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Adaptive and Fuel Efficient Planning and Control

An autonomous system for navigation of a vehicle can plan and control motion for the vehicle. The planning and control functions of the autonomous system rely on data about the vehicle and an environment in which the vehicle is travelling, including the position and movement of other vehicles and obstacles. The performance of the planning and control functions can depend on such data as the state of the vehicle and the conditions of the environment change.

Understanding an environment in which a vehicle having an autonomous system for navigation (e.g., ego vehicle) is travelling is fundamental to planning and control functions of the vehicle. For example, a truck travelling in an environment can plan a safe and efficient route to travel in the environment based on an understanding of the environment. The understanding of an environment can involve detecting obstacles such as other vehicles, pedestrians, traffic signals, objects, etc. The understanding of the environment also can involve understanding changes in the environment, such as changes in elevation. For example, a vehicle may improve fuel efficiency by coasting on a road with decreasing elevation (e.g., downhill).

However, under conventional approaches, planning and control for efficient navigation of a vehicle pose various technological challenges. Roads in different environments can have different changes in elevation over various distances. For example, an autonomous system of a vehicle can attempt to navigate a road in an environment with hilly terrain. When the vehicle travels downhill in the hilly terrain, the vehicle can gain speed as an effect of travelling downhill. The autonomous system of the vehicle may attempt to control the speed of the vehicle by applying brakes to counter the effect of travelling downhill. When the vehicle travels uphill in the hilly terrain, the vehicle can lose speed as an effect of travelling uphill. The autonomous system of the vehicle may attempt to maintain the speed of the vehicle by applying additional throttle to counter the effect of travelling uphill. In this way, the autonomous system of the vehicle inefficiently applies braking when the vehicle travels downhill and additional throttle when the vehicle travels uphill. The foregoing illustration is just one example of how conventional approaches to planning and control for efficient navigation fail to adapt for various changes in elevation over various distances. Further, even if a conventional technique can generate fuel efficient planning and control based on changes in elevation over a short distance, such planning and control are often inefficient over a longer distance. Thus, conventional approaches of autonomous systems for navigation face various challenges with respect to efficient planning and control.

The present technology provides improved approaches for navigation of a vehicle that overcome the aforementioned and other technological challenges. In various embodiments, the present technology provides for adaptive and efficient planning and control of a vehicle based on variations in elevation in an environment. Planning and control of the vehicle can be based on a regenerable elevation index determined for the environment. The regenerable elevation index can indicate a level or an amount of potential efficiency gains based on variations in elevation in the environment. Based on the regenerable elevation index, parameters can be determined for the vehicle. The parameters can include, for example, a horizon length and a speed range. The horizon length can provide a distance ahead of the vehicle to evaluate for planning and control of the vehicle. The speed range can provide a lower speed limit and upper speed limit within which a speed of the vehicle is to be maintained. Based on the parameters, a speed profile can be generated for the vehicle. The speed profile can provide target speeds at target positions along a route through the environment. Based on the speed profile, control actions for controlling the vehicle can be generated. The vehicle can be controlled to reach the target speeds at the target positions based on the control actions. The determination of parameters, generation of a speed profile, and generation of control actions described here can be repeated periodically or as necessary to adapt during navigation.

As an example, an autonomous system of a vehicle can navigate the vehicle through an environment that includes hilly terrain. As the vehicle travels through the environment, the autonomous system of the vehicle can determine a regenerable elevation index for a planned route through the environment. In this example, the regenerable elevation index for the environment can be higher than a regenerable elevation index for an environment with flat terrain based on a higher level of potential efficiency gains due to the hilly terrain. Based on the regenerable elevation index, the autonomous system can determine optimization parameters for the planned route. The optimization parameters can include, for example, a horizon length associated with a distance ahead of the vehicle to evaluate for planning and control of the vehicle and a speed range for target speeds. Based on the optimization parameters, the autonomous system can generate a speed profile for navigation of the planned route. The speed profile provides target speeds, which are within the speed range, at target positions along the planned route. The autonomous system can generate control actions for controlling the vehicle based on the speed profile. In this example, the autonomous system can generate control actions such as coasting, downshifting, or applying foundation brakes (e.g., air brakes, disc brakes) to reach the next target speed at the next target position. As illustrated in this example, use of the regenerable elevation index to determine the optimization parameters and the speed profile allows for the autonomous system to optimize fuel efficiency based on the hilly terrain of the environment. By generating control actions based on the speed profile, the autonomous system can adapt during navigation. Thus, the present technology provides improved approaches for adaptive and efficient planning and control of a vehicle. These and other inventive features and related advantages of the various embodiments of the present technology are discussed in more detail herein.

FIG. 1 illustrates an example system 100 including an adaptive speed module 102, according to some embodiments of the present technology. The adaptive speed module 102 can provide support for various functions of an autonomous system of navigation of any type of vehicle (or ego vehicle), such as a truck. The adaptive speed module 102 can generate planning data 114 and control data 116. The planning data 114 can include, for example, regenerable elevation index data and speed profile data. The control data 116 can include, for example, control action data for navigation of a vehicle. The adaptive speed module 102 can support or be implemented as part of a planning function of an autonomous system of a vehicle, such as a prediction and planning module 616 of an autonomous system 610 of FIG. 6, as discussed in more detail below. Alternatively or additionally, the safe navigation module 102 can support or be implemented as part of a control function of an autonomous system of a vehicle, such as a control module 618 of the autonomous system 610 of FIG. 6, as discussed in more detail below. The adaptive speed module 102 can generate the planning data 114 and the control data 116 based on various data, such as detection data 104 and map data 106, which are discussed in more detail below.

In some embodiments, some or all of the functionality performed by the adaptive speed module 102 may be performed by one or more computing systems implemented in a vehicle. In some embodiments, some or all of the functionality performed by the adaptive speed module 102 may be performed by one or more backend computing systems (e.g., remote from a vehicle). In some embodiments, some or all of the functionality performed by the adaptive speed module 102 may be performed by one or more computing systems associated with (e.g., carried by) one or more users riding in a vehicle. In some embodiments, some or all data processed and/or stored by the adaptive speed module 102 can be stored in a data store (e.g., local to the adaptive speed module 102) or other storage system (e.g., cloud storage remote from adaptive speed module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the adaptive speed module 102 can be implemented in any suitable combinations. Functionalities of the adaptive speed module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The adaptive speed module 102 can include a parameter optimization module 108. The parameter optimization module 108 can determine parameters for generating a speed profile. The parameters can include, for example, a horizon length that indicates a distance ahead of a vehicle to evaluate for planning and control of the vehicle and a speed range that provides a lower speed limit and upper speed limit within which a speed of the vehicle is to be maintained. In some cases, the speed range can be limited by predetermined constraints, such as a speed limit for an environment as an upper speed limit. Based in part on the parameters, a regenerable elevation index can be determined to indicate potential for fuel efficiency gains based on variations in elevation in an environment. An environment with more variation in elevation can have greater potential for fuel efficiency gains and a higher regenerable elevation index than an environment with less variation in elevation. For example, environments that are flat, environments that are mostly or only downhill, and environments that are mostly or only uphill can have low variation in elevation and low regenerable elevation indexes. Environments that include, for example, hilly terrain can have high variation in elevation and high regenerable elevation indexes. The regenerable elevation index can be determined based on metrics for the environment, a horizon length, and a speed range. The metrics for the environment can include, for example, elevations in the environment, a number of downhill portions in the environment, lengths of the downhill portions in the environment, a number of uphill portions in the environment, and lengths of the uphill portions in the environment. In some cases, the metrics for the environment can be provided in a map of the environment. For example, a regenerable elevation index determined for an environment based on the metrics for the environment, a horizon length of 35,000 meters, and a speed range of 30 miles per hour to 60 miles per hour can be a value indicative of potential fuel efficiency gains for travel in the environment within the next 35,000 meters provided the speed of a vehicle in the environment remains within the speed range of 30 miles per hour to 60 miles per hour.

The parameter optimization module 108 can determine a regenerable elevation index based on machine learning methodologies. One or more machine learning models can be trained to generate a regenerable elevation index for an environment based on metrics for the environment, a horizon length, and a speed range. For example, a machine learning model can be trained to generate regenerable elevation indexes based on training data that includes fuel economy performance improvements of vehicles in simulations of environments. A fuel economy performance improvement can be associated or correlated with or otherwise indicative of a regenerable elevation index. An instance of training data can include metrics for an environment, a horizon length, and a speed range. A vehicle navigating the environment can be simulated based on the metrics for the environment, the horizon length, and the speed range. A fuel economy performance improvement can be determined based on the simulation. The fuel economy performance improvement can be determined relative to a baseline fuel economy performance in which the vehicle maintains a constant speed (e.g., speed limit). The instance of training data can be provided for training the machine learning model as an input-output pair, with the metrics for the environment, the horizon length, and the speed range as the input, and the fuel economy performance improvement associated with the output. The machine learning model can generate a regenerable elevation index based on the metrics for the environment, the horizon length, and the speed range of the instance of training data. The machine learning model can be trained to generate regenerable elevation indexes that correlate with fuel economy performance improvements determined from simulations. For example, a first instance of training data can include a fuel economy performance improvement that is higher than the fuel economy performance improvement of a second instance of training data. The machine learning model can be trained so that the machine learning model generates a regenerable elevation index based on the input of the first instance of training data that is higher than the regenerable elevation index generated by the machine learning model based on the input of the second instance of training data.

The parameter optimization module 108 can apply a machine learning model to determine parameters for generating a speed profile. For an environment, metrics for the environment, different horizon lengths, and different speed ranges can be provided to the machine learning model. The machine learning model can generate a regenerable elevation index for each horizon length and speed range provided to the machine learning model. The different horizon lengths and the different speed ranges can be evaluated based on the associated regenerable elevation indexes. For the environment, the parameters for generating a speed profile can be the horizon length and the speed range associated with the highest regenerable elevation index. The machine learning model can be further trained or refined based on the regenerable elevation indexes generated by the machine learning model. An instance of training data for further training or refining the machine learning model can include the parameters associated with the highest regenerable elevation index and performance of a vehicle based on the parameters. The instance of training data can include an input-output pair with an input that includes the parameters associated with the highest regenerable elevation index and the metrics for the environment. The output of the input-output pair can be associated with actual fuel economy performance improvements determined based on the performance of the vehicle.

As an illustration, an autonomous system of a vehicle can navigate the vehicle in an environment. The autonomous system of the vehicle can determine parameters for generating a speed profile for the environment. The autonomous system can determine metrics for the environment based on a map of the environment. The metrics for the environment, different horizon lengths, and different speed ranges can be provided to a machine learning model. For each horizon length and speed range provided to the machine learning model, the machine learning model can generate a regenerable elevation index that indicates potential fuel economy gains based on the metrics for the environment, the horizon length, and the speed range. Based on the regenerable elevation indexes generated by the machine learning model, the parameters for generating the speed profile can be determined. In this example, the parameters can include the horizon length and the speed range of the different horizon lengths and different speed ranges provided to the machine learning model that correspond with the highest regenerable elevation index. Many variations are possible.

The adaptive speed module 102 can include a speed profile module 110. The speed profile module 110 can generate a speed profile for a vehicle in an environment. The speed profile can provide a series of target speeds at corresponding target positions to be travelled by the vehicle. The speed profile for the vehicle can be generated based on parameters, such as a horizon length and a speed range determined for the environment, vehicle dynamics, and real-time inputs. The vehicle dynamics can include, for example, a vehicle body model of the vehicle, a powertrain model of the vehicle, longitudinal dynamics associated with the vehicle model, and an energy efficiency map for the vehicle model. The energy efficiency map can describe a relationship between fuel efficiency and speed for the vehicle model. The real-time inputs can include, for example, vehicle status of the vehicle, and localization of the vehicle. The vehicle status can include, for example, a speed, an acceleration, and a brake condition of the vehicle. The localization can include, for example, a location, a direction, a pose, and an elevation of the vehicle. Based on the parameters, the vehicle dynamics, and the real-time inputs, the speed profile can be generated to minimize fuel usage subject to speed limits indicated by the speed range and powertrain limits indicated by the vehicle dynamics. The speed profile can include target speeds at target positions to minimize fuel usage for the horizon length. The speed profile module 110 can generate new or updated speed profiles to adapt to updated parameters, updated vehicle dynamics, and updated real-time inputs. For example, as a vehicle navigates an environment, parameters can be updated based on the environment to achieve a higher regenerable elevation index. Vehicle dynamics can be updated to account for detected changes to the vehicle. Updated real-time inputs can be captured as the vehicle navigates the environment. A new or updated speed profile can be generated based on the updated parameters, the updated vehicle dynamics, or the updated real-time inputs.

As an illustration, an autonomous system of a vehicle can navigate the vehicle in an environment with hilly terrain. The autonomous system of the vehicle can determine parameters for generating a speed profile for the environment. The speed profile can be generated based on the parameters, vehicle dynamics of the vehicle, and real-time inputs captured by the autonomous system. In this example, the speed profile can include decreasing (relatively slower) target speeds at target positions ahead of the vehicle that correspond with an uphill portion of the hilly terrain. The decrease in target speeds allows the vehicle to travel the uphill portion while minimizing fuel usage by reducing throttle usage. The speed profile can include increasing (relatively faster) target speeds at target positions ahead of the vehicle that correspond with a downhill portion of the hilly terrain. The increase in target speeds allow the vehicle to travel the downhill portion while improving fuel efficiency by reducing brake usage.

The adaptive speed module 102 can include a control optimization module 112. The control optimization module 112 can generate control actions for controlling a vehicle in a fuel efficient manner. The control actions can be generated based on a speed profile. For example, the control actions can be generated based on a next target speed and next target position in the speed profile. The control actions can be generated to achieve the next target speed at the next target position in the speed profile based on which control actions available to the vehicle are more fuel efficient. For example, control actions for reducing speed on a vehicle with an internal combustion powertrain can include coasting, application of foundation brakes, application of engine brakes, and downshifting. Control actions for increasing speed on a vehicle with an internal combustion powertrain can include application of throttle and upshifting. Control actions for reducing speed on a vehicle with an electric powertrain can include coasting, application of foundation brakes, and application of regenerative brakes. Control actions for increasing speed on a vehicle with an electric powertrain can include application of throttle. The various control actions can be associated with various level of fuel efficiency. For example, application of foundation brakes is generally less fuel/energy efficient than other control actions for reducing speed. The control optimization module 112 can generate a combination or series of control actions based on the levels of fuel efficiency associated with the control actions to improve fuel efficiency while achieving the next target speed at the next target position. The control optimization module 112 can repeatedly generate control actions based on updated speed profiles.

As an illustration, an autonomous system of a vehicle can navigate the vehicle through an environment. The autonomous system can generate a speed profile for the environment based on parameters determined for the environment, vehicle dynamics of the vehicle, and real-time inputs. The speed profile can include, for example, decreasing target speeds at target positions ahead of the vehicle for a flat portion in the environment preceding a downhill portion and increasing target speeds at target positions on the downhill portion. The speed profile can include a next target speed at a next target position. The next target speed can be lower than a current speed of the vehicle. The autonomous system can generate control actions to reduce speed of the vehicle to the next target speed by the time the vehicle reaches the next target position. In this example, the vehicle can determine that a first combination of coasting and application of foundation brake can achieve the next target speed at the next target position, a second combination of coasting and application of engine brake can achieve the next target speed at the next target position, and a third combination of downshifting and application of throttle can achieve the next target speed at the next target position. The autonomous system can select and generate the second combination for control of the vehicle as the most fuel efficient combination of the three combinations. The second combination can be the most fuel efficient combination of the three combinations because the second combination achieves the next target speed at the next target position without application of foundation brakes and without application of throttle. Many variations are possible.

Figure 2:
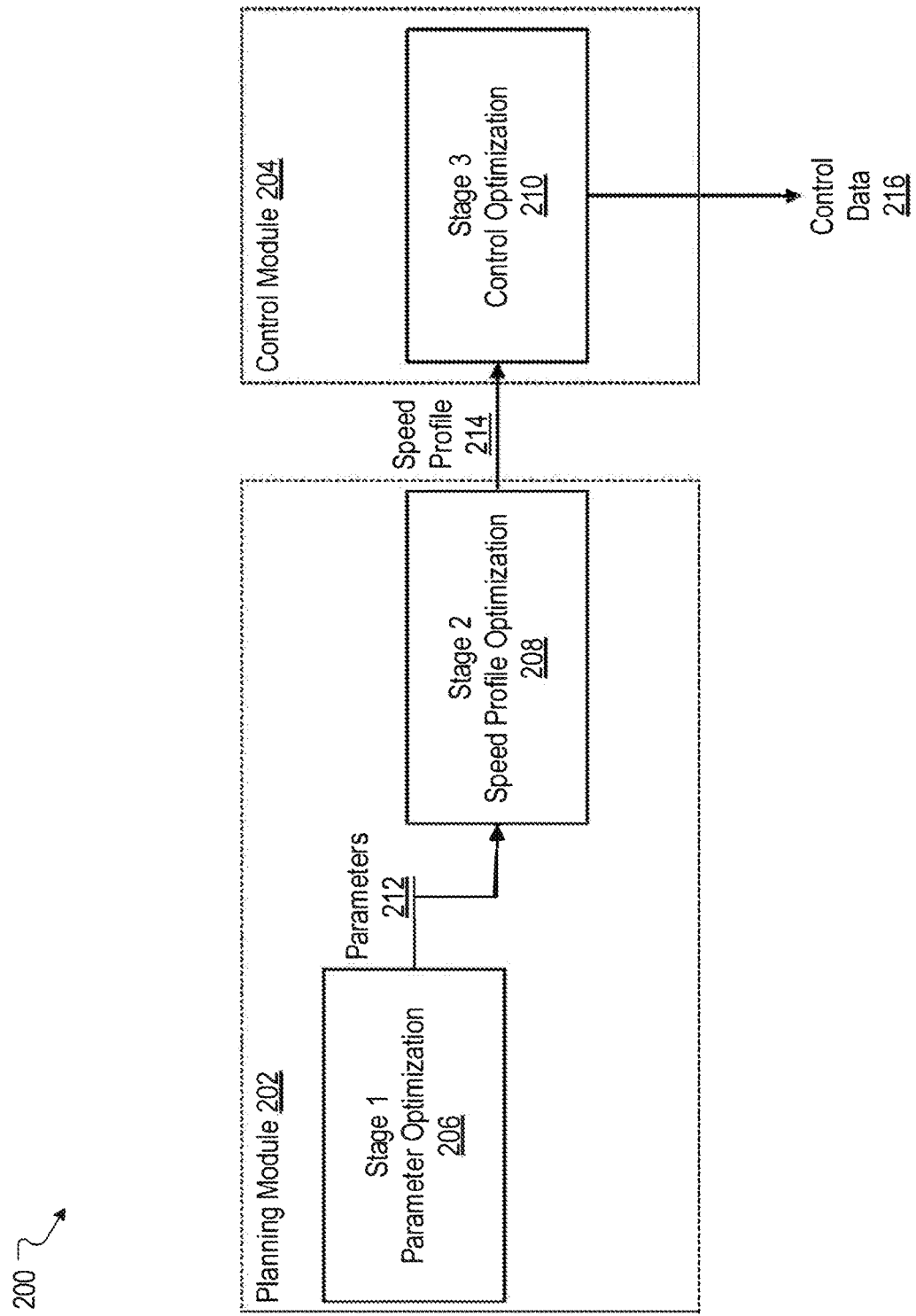
FIG. 2 illustrates an example block diagram associated with adaptive and fuel efficient planning and control, according to embodiments of the present technology.

FIG. 2 illustrates an example block diagram 200 associated with adaptive and fuel efficient planning and control, according to some embodiments of the present technology. The various functionality described herein for adaptive and fuel efficient planning and control can be performed by, for example, the adaptive speed module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 2, generation of control data 216 can be based on a three stage process. The control data 216 can include, for example, control actions for control of a vehicle in an environment. The three stage process includes a stage 1 parameter optimization 206. In the stage 1 parameter optimization 206, parameters 212 can be generated based on a regenerable elevation index for the environment. The regenerable elevation index can be determined, for example, based on metrics for the environment. The three stage process includes a stage 2 speed profile optimization 208. In the stage 2 speed profile optimization 208, a speed profile can be generated based on the parameters 212 generated in the stage 1 parameter optimization 206. As illustrated in FIG. 2, the stage 1 parameter optimization 206 and the stage 2 speed profile optimization 208 can be performed by a planning module 202. The three stage process includes a stage 3 control optimization 210. In the stage 3 control optimization 210, the control data 216 can be generated based on the speed profile 214 generated in the stage 2 speed profile optimization 208. As illustrated in FIG. 2, the stage 3 control optimization 210 can be performed by a control module 204. Many variations are possible.

Figure 3A:
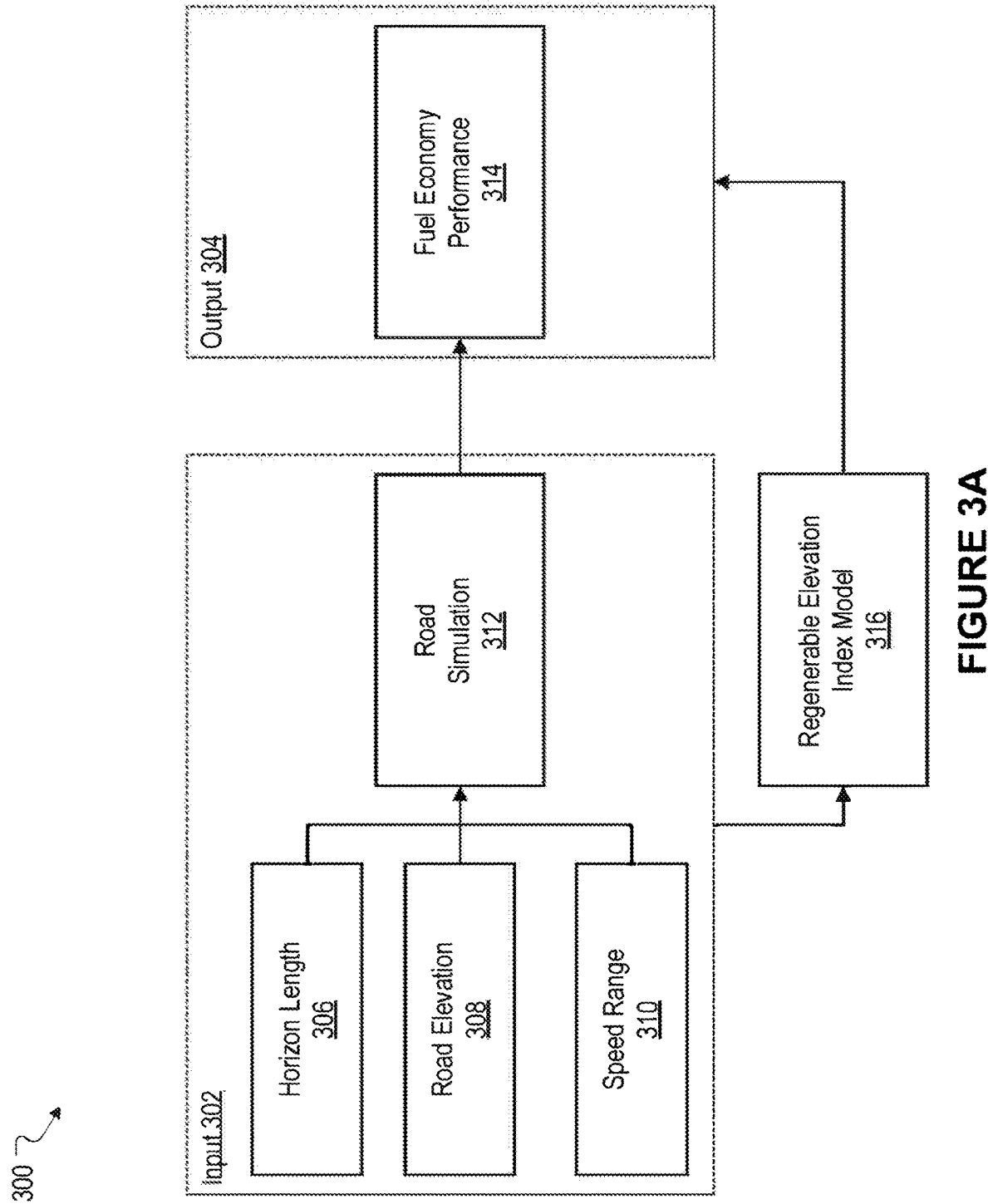
FIGS. 3A-3B illustrate example block diagrams associated with adaptive and fuel efficient planning and control, according to embodiments of the present technology.
Figure 3B:
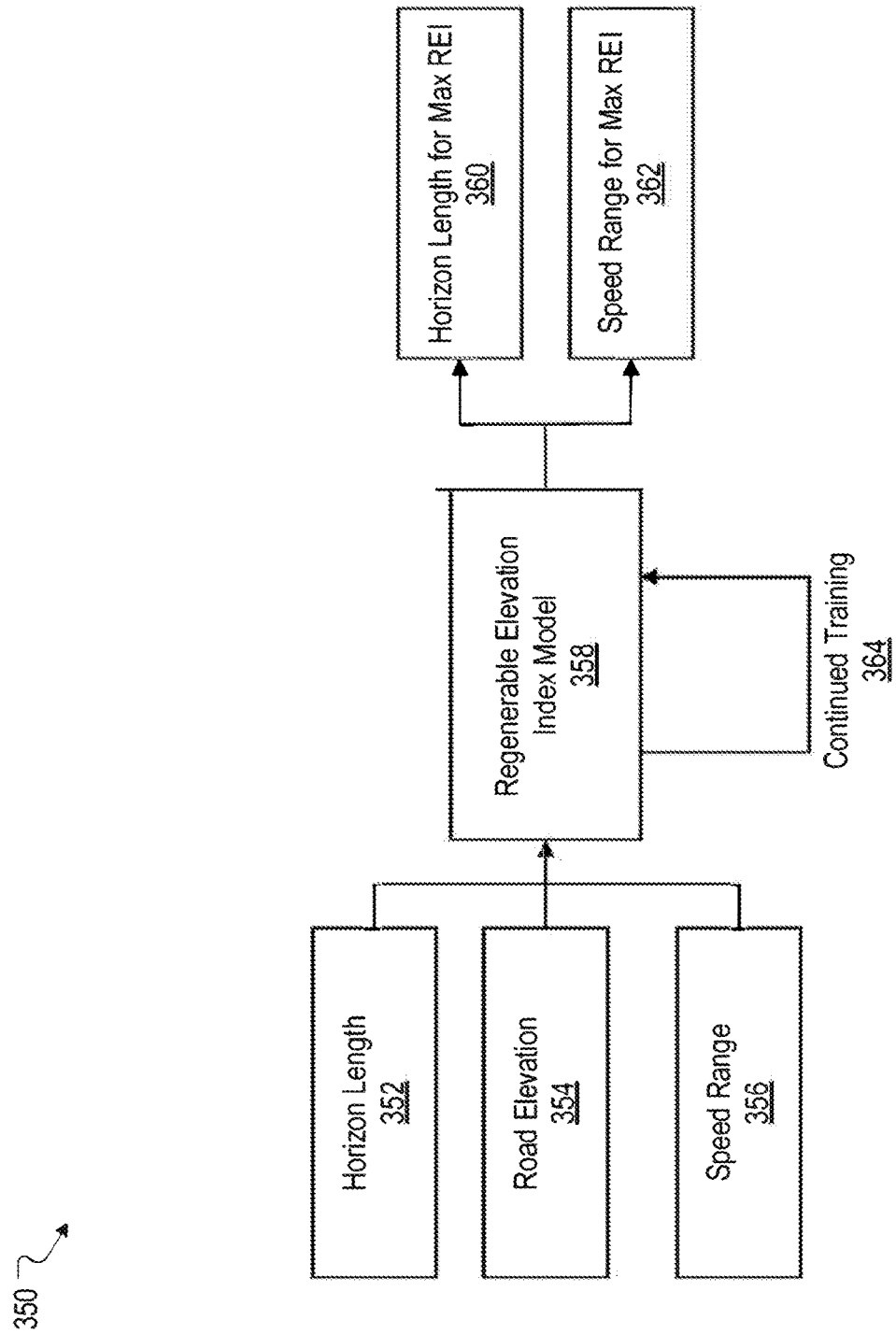

FIGS. 3A-3B illustrate examples associated with adaptive and fuel efficient planning and control, according to some embodiments of the present technology. The various functionality described herein for adaptive and fuel efficient planning and control can be performed by, for example, the adaptive speed module 102 of FIG. 1. It should be understood that there can be additional, fewer, or alternative functionality or steps performed in similar or alternative orders, or in parallel, based on the various features and embodiments discussed herein unless otherwise stated.

FIG. 3A illustrates an example 300 associated with training a machine learning model for generating a regenerable elevation index. As illustrated in the example 300, a regenerable elevation index model 316 can be trained based on input 302 and input 304. The input 302 can include a horizon length 306, a road elevation 308, and a speed range 310. The horizon length 306 can provide a distance ahead of a vehicle in an environment. The road elevation 308 (or metrics) can provide elevations of the environment. The speed range 310 can provide a lower speed limit and an upper speed limit within which to maintain a speed of the vehicle. A road simulation 312 can be based on the horizon length 306, the road elevation 308, and the speed range 310. The road simulation 312 can simulate performance of the vehicle in the environment with the elevations provided by the road elevation 308. The road simulation 312 can simulate performance of the vehicle for the distance provided by the horizon length 306 while maintaining a speed within the lower speed limit and the upper speed limit provided by the speed range 310. The output 304 can include a fuel economy performance 314. The fuel economy performance 314 can be determined for the horizon length 306, the road elevation 308, and the speed range 310 based on the road simulation 312. The fuel economy performance 314 can indicate an improvement in fuel economy of the simulated performance of the vehicle in the road simulation 312 over a vehicle maintaining a baseline speed (e.g., speed limit). The input 302 and the output 304 can be used to train the regenerable elevation index model 316 as an input-output pair. The input 302 can be provided to the regenerable elevation index model 316. The regenerable elevation index model 316 can generate a regenerable elevation index based on the input 302. The regenerable elevation index generated by the regenerable elevation index model 316 can be compared with the output 304. The regenerable elevation index model 316 can be trained so that the regenerable elevation index generated by the regenerable elevation index model 316 correlates with the fuel economy performance 314. Many variations are possible.

FIG. 3B illustrates an example 350 associated with applying a machine learning model to determine parameters for generating a speed profile. As illustrated in the example 350, horizon length 352, road elevation 354, and speed range 356 can be provided to a regenerable elevation index model 358. The horizon length 352 can provide a distance ahead of a vehicle in an environment. The road elevation 354 (or metrics) can provide elevations of the environment. The speed range 356 can provide a lower speed limit and an upper speed limit within which to maintain a speed of the vehicle. The regenerable elevation index model 358 can generate a regenerable elevation index based on the horizon length 352, the road elevation 354, and the speed range 356. Based on the regenerable elevation index generated by the regenerable elevation index model 358, a horizon length associated with a maximum regenerable elevation index 360 and a speed range associated with the maximum regenerable elevation index 362 can be determined. The horizon length 360 and the speed range 362 can be provided as the parameters for generating the speed profile. As illustrated in the example 350, the regenerable elevation index model 358 can continue to be trained 364. An instance of training data can be based on the horizon length 360, the speed range 362, and the road elevation 354 as the input of an input-output pair. The output of the input-output pair can be associated with fuel economy performance improvements determined from performance of a vehicle based on a speed profile generated from the horizon length 360 and the speed range 362. Many variations are possible.

Figure 4A:
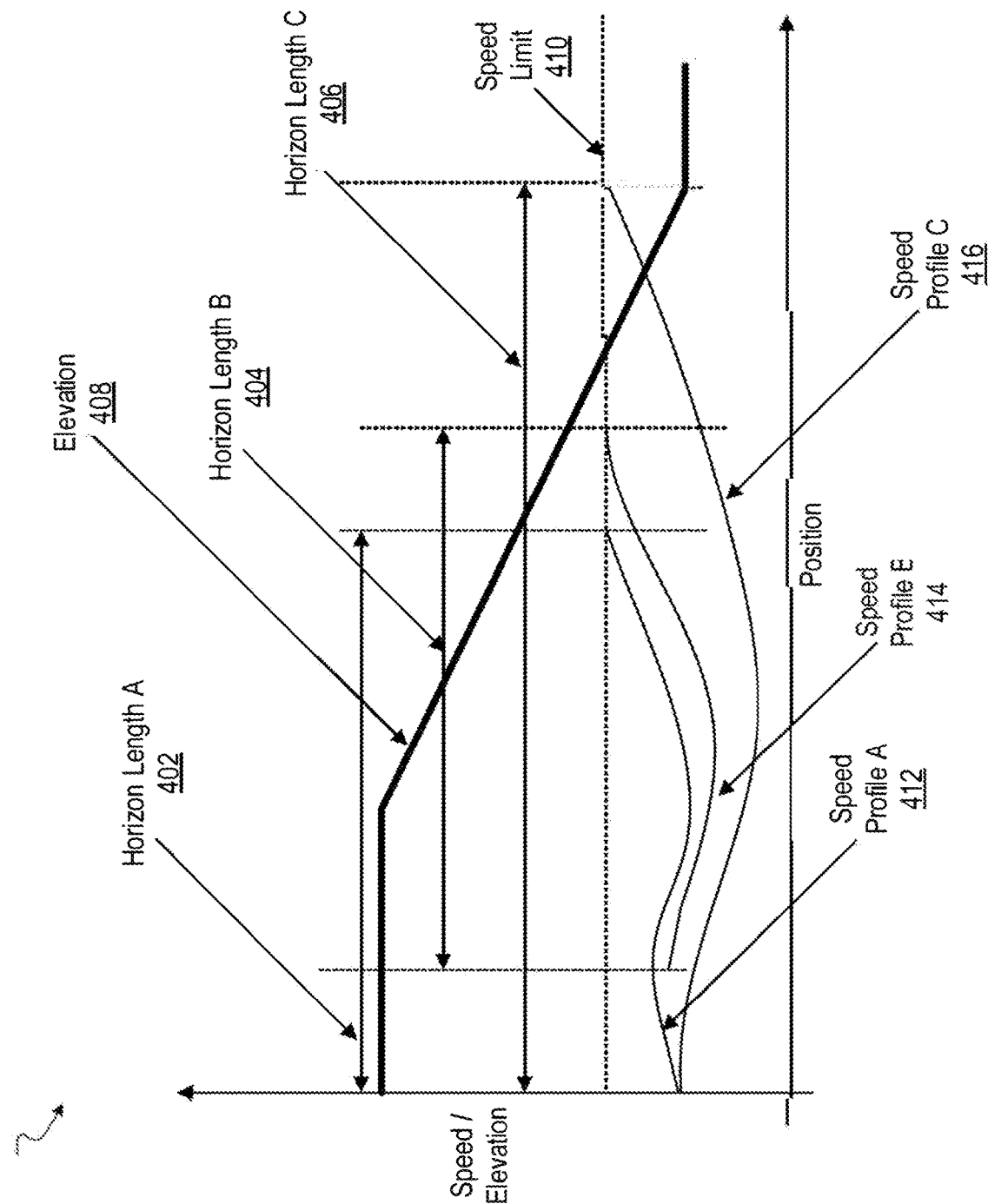
FIGS. 4A-4C illustrate examples associated with adaptive and fuel efficient planning and control, according to embodiments of the present technology.
Figure 4B:
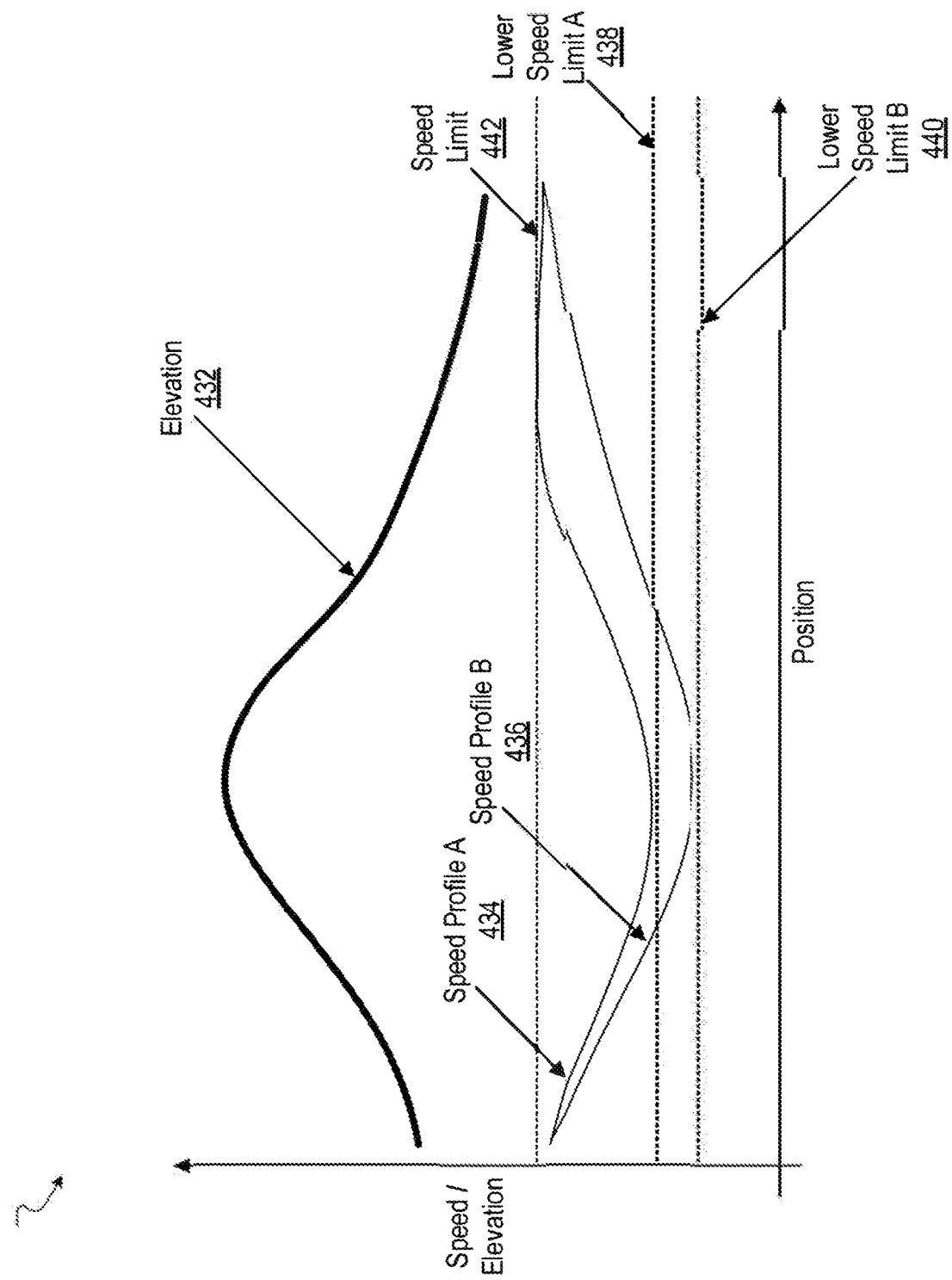
Figure 4C:
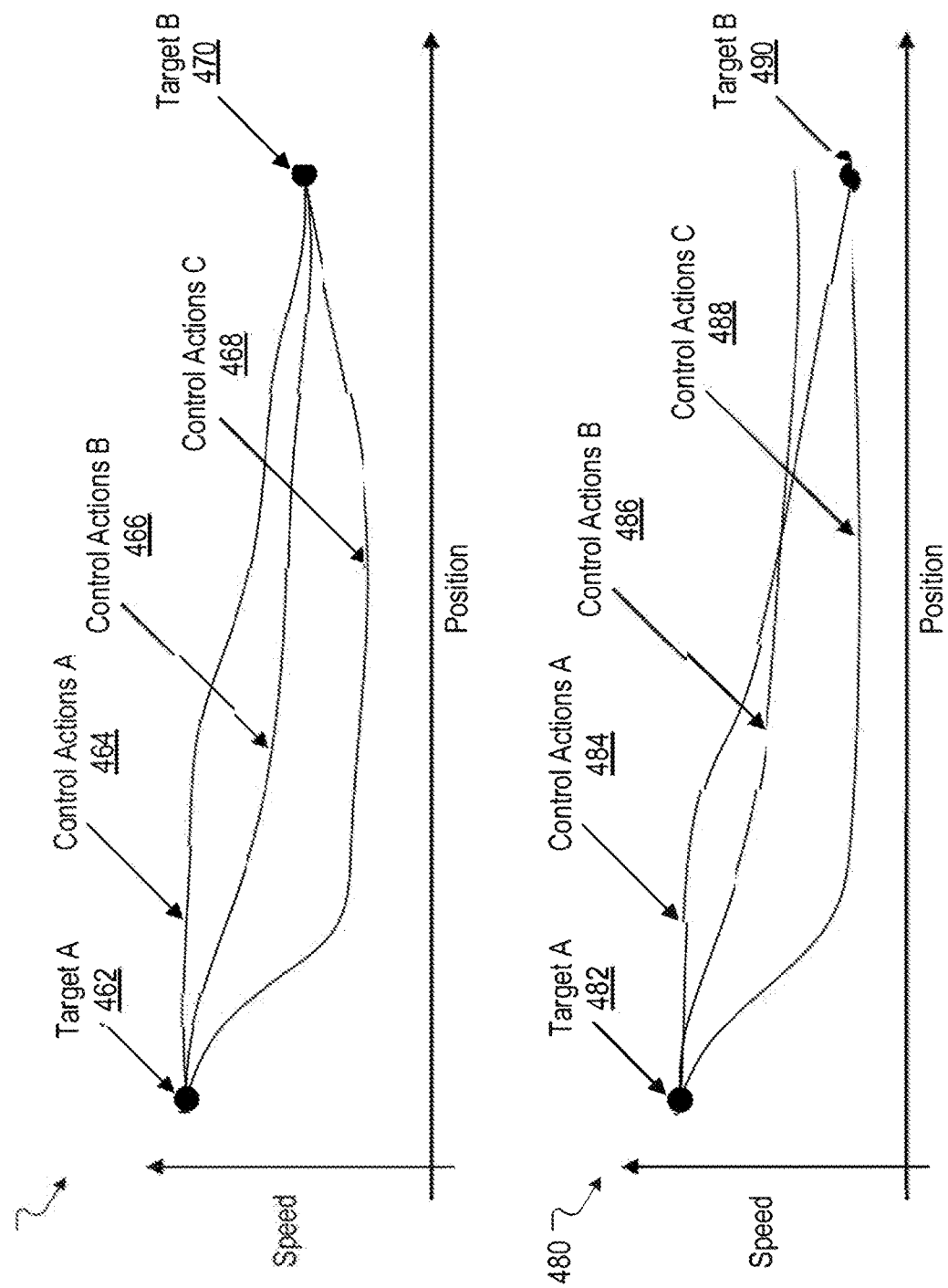

FIGS. 4A-4C illustrate examples associated with adaptive and fuel efficient planning and control in various scenarios, according to some embodiments of the present technology. The various functionality described herein for adaptive and fuel efficient planning and control in various scenarios can be performed by, for example, the adaptive speed module 102 of FIG. 1. It should be understood that there can be additional, fewer, or alternative blocks, functionality, or steps performed in similar or alternative orders, or in parallel, based on the various features and embodiments discussed herein unless otherwise stated.

FIG. 4A illustrates an example 400 associated with different speed profiles generated based on different horizon lengths. The example 400 includes elevation 408 of a downhill portion in an environment. The environment can have a speed limit 410. As illustrated in FIG. 4A, horizon length A 402 does not encompass the entirety of the downhill portion in the environment. Speed profile A 412, generated based on horizon length A 402, includes increasing speed followed by coasting through the downhill portion before reaching the speed limit 410 at the end of horizon length A 402. Horizon length B 404 does not encompass the entirety of the flat portion prior to the downhill portion and does not encompass the entirety of the downhill portion in the environment. Speed profile B 414, generated based on horizon length B 404, includes coasting prior to the downhill portion before reaching the speed limit 410 at the end of horizon length B 404. Horizon length C 406 encompasses the entirety of the flat portion prior to the downhill portion and encompasses the entirety of the downhill portion in the environment. Speed profile C 416, generated based on horizon length C 406, includes coasting through the entirety of the flat portion prior to the downhill portion and coasting through the entirety of the downhill portion before reaching the speed limit 410 at the end of horizon length C. As illustrated in this example, speed profile C 416 provides for improved fuel efficiency over speed profile A 412 and speed profile B 414. A vehicle travelling based on speed profile A 412 needlessly applies throttle on the flat portion and reaches the speed limit 410 during the downhill portion, which requires the vehicle to apply brakes to avoid exceeding the speed limit 410. A vehicle travelling based on speed profile B 414 reaches the speed limit 410 during the downhill portion and must apply brakes to avoid exceeding the speed limit 410. A vehicle travelling based on speed profile C 416 travels the flat portion and the downhill portion without applying throttle and does not need to apply brakes to avoid exceeding the speed limit 410. Thus, a longer horizon length can provide for generation of a more efficient speed profile. Many variations are possible.

FIG. 4B illustrates an example 430 associated with different speed profiles generated based on different speed ranges. The example 430 includes elevation 432 of a hill in an environment. The environment can have a speed limit 442, which can be an upper speed limit for the speed ranges in this example. As illustrated in FIG. 4B, speed profile A 434, generated based on a speed range with lower speed limit A 438, includes coasting for the uphill portion of the hill in the environment and coasting for the downhill portion of the hill in the environment. Based on the lower speed limit A 438, speed profile A 434 does not reduce speed lower than lower speed limit A 438 and reaches the speed limit 442 before reaching the end of the downhill portion. Speed profile B 436, generated based on a speed range with lower speed limit B 440, includes coasting for the uphill portion of the hill in the environment and coasting for the downhill portion of the hill in the environment. Based on the lower speed limit B 440, speed profile B 436 reaches the lower speed limit B 440 during the downhill portion and reaches the speed limit 442 at the end of the downhill portion. As illustrated in this example, speed profile B 436 provides improved fuel efficiency over speed profile A 434. A vehicle travelling based on speed profile A 434 must apply brakes to avoid exceeding the speed limit 442. A vehicle travelling based on speed profile B 436 can coast through the hill without applying brakes. Thus, a larger speed range can provide for generation of a more efficient speed profile. Many variations are possible.

FIG. 4C illustrates examples 460, 480 associated with different control actions generated based on a speed profile. In the example 460, the speed profile includes a target A 462, which includes a target speed and corresponding target position, and a target B 470, which includes a target speed and corresponding target position. Control actions A 464, control actions B 466, and control actions C 468 can be generated to achieve the target speed at the target position for target B 470 from target A 462. In this example, control actions A 464 can include coasting and application of foundation brake. Control actions B 466 can include coasting and application of engine brake. Control actions C 468 can include downshifting and application of throttle. Control actions A 464, control actions B 466, and control actions C 468 all achieve the target speed at the target position for target B 470. In this example, control actions B 466 can be used for controlling a vehicle as it is more fuel efficient than the other control actions and achieves the target speed at the target position for target B 470. In the example 480, the speed profile includes a target A 482, which includes a target speed and corresponding target position, and a target B 490, which includes a target speed and corresponding target position. Control actions A 484, control actions B 486, and control actions C 488 can be generated to achieve the target speed at the target position for target B 490 from target A 482. In this example, control actions A 484 can include coasting and application of foundation brake. Control actions B 486 can include coasting and application of engine brake. Control actions C 488 can include downshifting and application of throttle. Control actions A 484 and control actions C 488 achieve the target speed at the target position for target B 490. Control actions B 486 fails to achieve the target speed at the target position for target B 490. In this example, control actions C 488 can be used for controlling a vehicle as it is more fuel efficient than control actions A 484 and achieves the target speed at the target position for target B 490. Many variations are possible.

Figure 5:
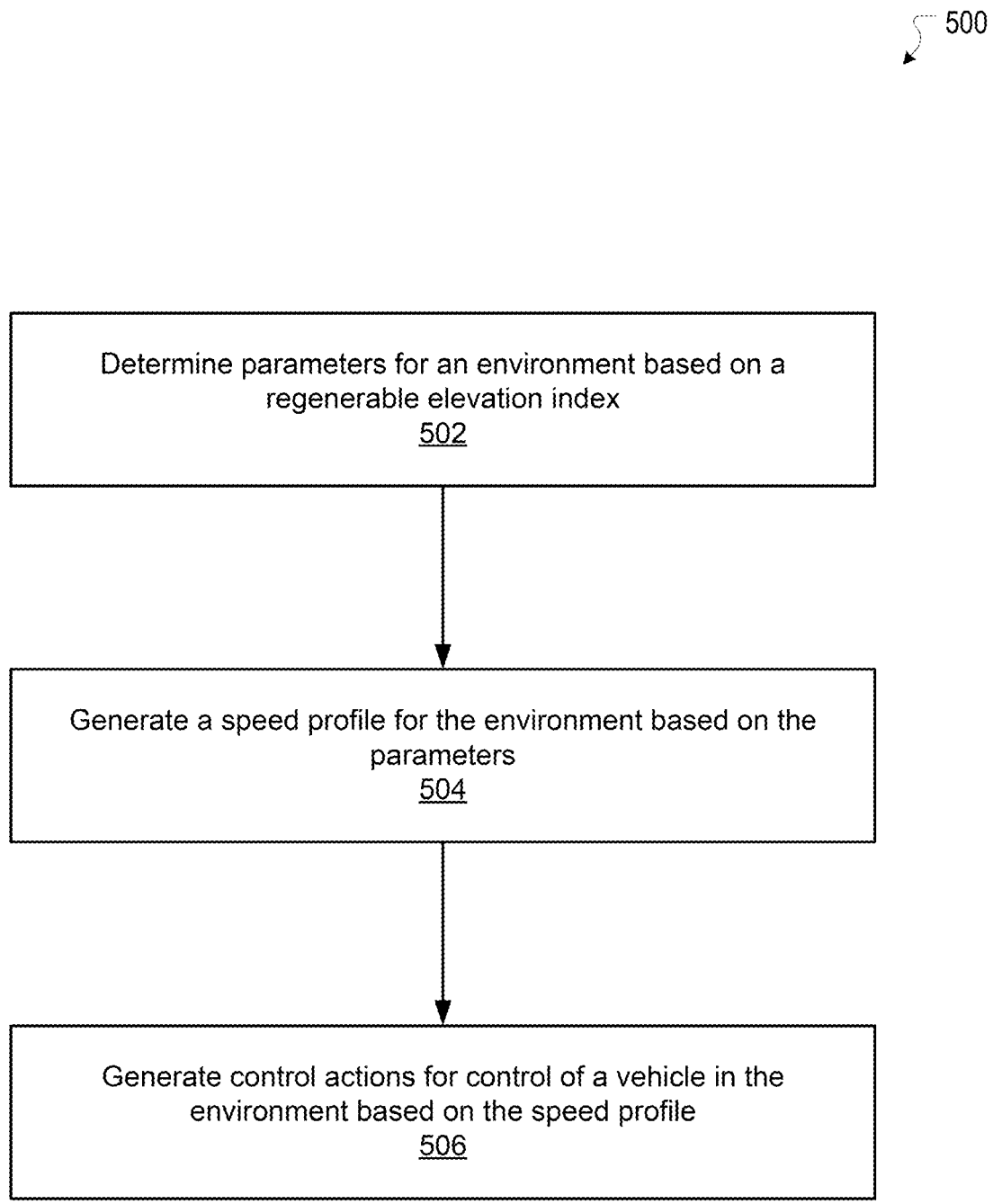
FIG. 5 illustrates an example method, according to embodiments of the present technology.

FIG. 5 illustrates an example method 500, according to embodiments of the present technology. At block 502, the example method 500 determines parameters for an environment based on a regenerable elevation index. At block 504, the example method 500 generates a speed profile for the environment based on the parameters. At block 506, the example method 500 generates control actions for control of a vehicle in the environment based on the speed profile. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
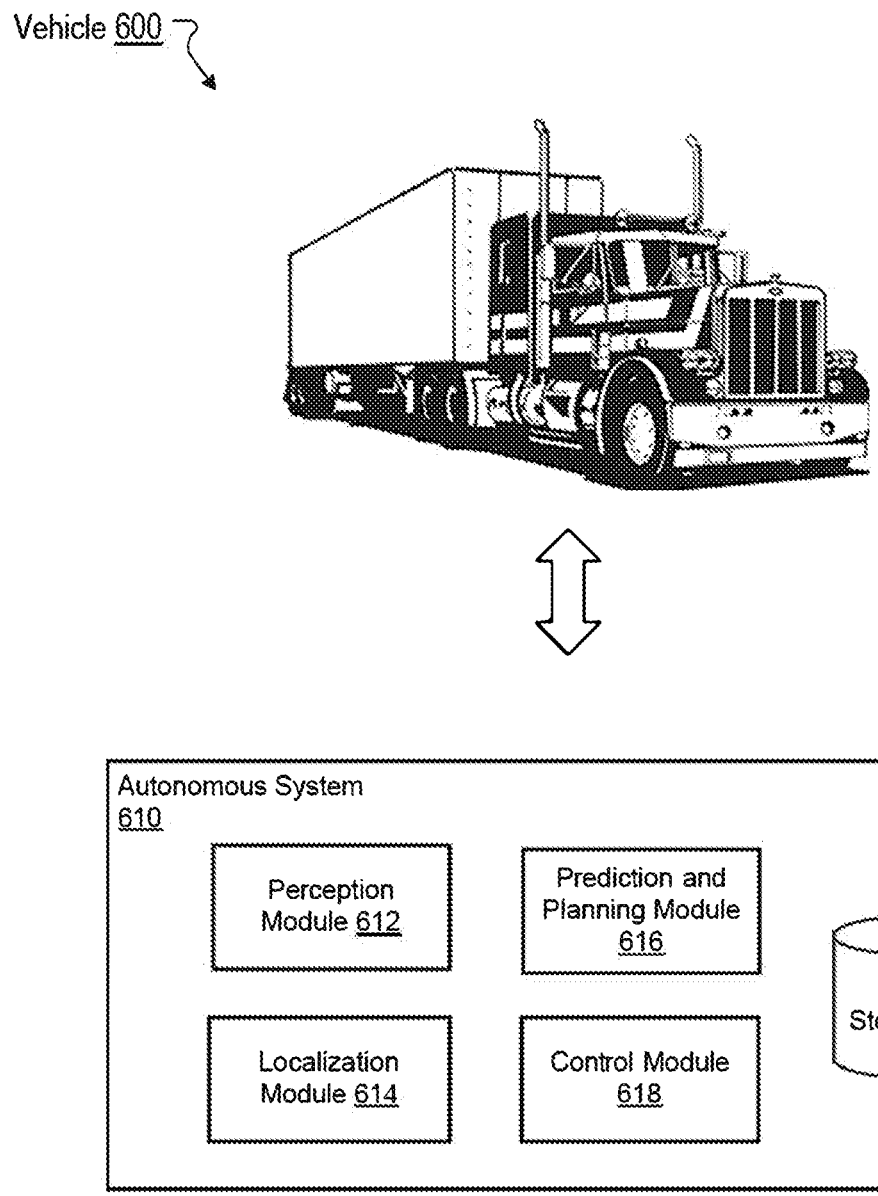
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is travelling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system

610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
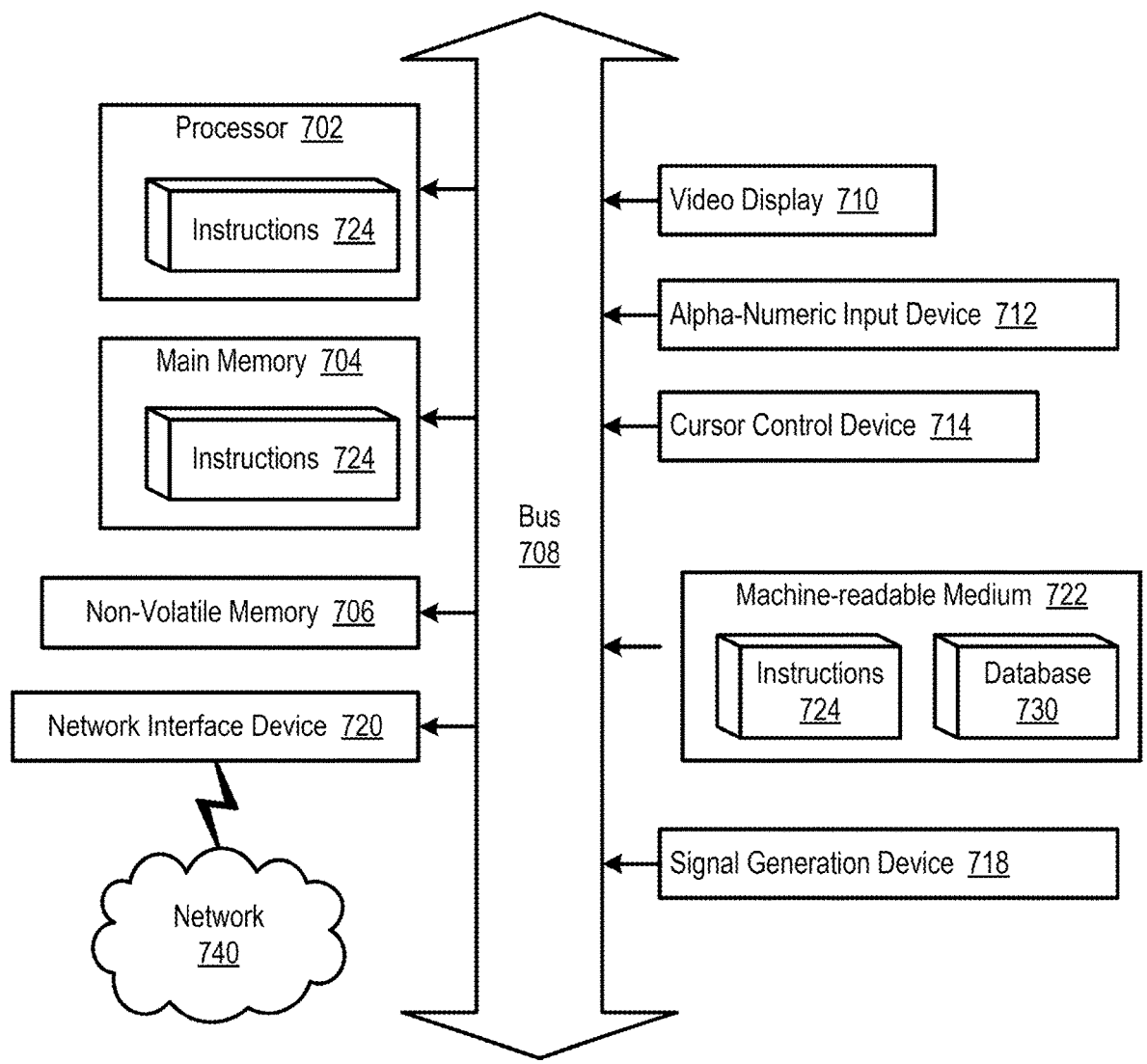
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 922 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    based on a machine learning model, determining, by a computing system, a set of regenerable elevation indexes for distances ahead of a vehicle in an environment and speed ranges for the vehicle;
    selecting, by the computing system, a highest regenerable elevation index of the set of regenerable elevation indexes determined by the machine learning model;
    determining, by the computing system, parameters for the environment based on the highest regenerable elevation index of the set of regenerable elevation indexes;
    generating, by the computing system, a speed profile for the environment based on the parameters;
    generating, by the computing system, control actions for the vehicle in the environment based on the speed profile; and
    causing, by the computing system, control of at least one of braking, acceleration, and steering of the vehicle to generate movement based on the control actions.

2. The computer-implemented method of claim 1, wherein the parameters include a horizon length and a speed range associated with the highest regenerable elevation index, wherein the horizon length provides a distance ahead of the vehicle, and wherein the speed range provides a lower speed limit and an upper speed limit.

3. The computer-implemented method of claim 1, wherein the speed profile is generated based on vehicle dynamics for the vehicle and real-time inputs, wherein the vehicle dynamics include at least one of: a vehicle body model of the vehicle, a powertrain model of the vehicle, longitudinal dynamics associated with the vehicle, and an energy efficiency map for the vehicle, and wherein the real-time inputs include at least one of: a speed of the vehicle, an acceleration of the vehicle, a brake condition of the vehicle, a location of the vehicle, a direction of the vehicle, a pose of the vehicle, and an elevation of the vehicle.

4. The computer-implemented method of claim 1, wherein the speed profile includes a set of target speeds and a set of target positions associated with the set of target speeds, and wherein the control actions are generated based on a first target speed of the set of target speeds and a first target position of the set of target positions.

5. The computer-implemented method of claim 1, wherein the determining the parameters for the environment comprises:
    providing, by the computing system, a set of parameters, including the parameters for the environment, and metrics for the environment to a machine learning model, wherein the set of regenerable elevation indexes is determined based on the machine learning model, and wherein the machine learning model is trained based on simulations of vehicle performance in environments and fuel economy performance improvements determined based on the simulations.

6. The computer-implemented method of claim 5, wherein the fuel economy performance improvements are relative to a baseline fuel economy performance based on a vehicle at a constant speed.

7. The computer-implemented method of claim 5, further comprising:
    providing, by the computing system, the parameters associated with the highest regenerable elevation index as an input of an input-output pair for training; and
    providing, by the computing system, fuel economy performance improvements determined based on performance of the vehicle as associated with an output of the input-output pair.

8. The computer-implemented method of claim 5, wherein the metrics for the environment include at least one of: elevations in the environment, a number of downhill portions in the environment, lengths of the downhill portions in the environment, a number of uphill portions in the environment, and lengths of the uphill portions in the environment.

9. The computer-implemented method of claim 1, wherein the control actions include at least one of: coasting, application of foundation brakes, application of engine brakes, application of gear shift, and application of regenerative brakes.

10. The computer-implemented method of claim 1, further comprising:
    generating, by the computing system, an updated speed profile based on at least one of: updated parameters, updated vehicle dynamics, and updated real-time inputs.

11. The computer-implemented method of claim 1, wherein a regenerable elevation index for a hilly terrain is relatively higher than a regenerable elevation index for a flat terrain.

12. A system comprising:
    at least one processor; and
    a memory storing instructions that, when executed by the at least one processor, cause the system to perform operations comprising:
        based on a machine learning model, determining a set of regenerable elevation indexes for distances ahead of a vehicle in an environment and speed ranges for the vehicle;
        selecting, by the computing system, a highest regenerable elevation index of the set of regenerable elevation indexes determined by the machine learning model;
        determining parameters for the environment based on the highest regenerable elevation index of the set of regenerable elevation indexes;
        generating a speed profile for the environment based on the parameters;
        generating control actions for the vehicle in the environment based on the speed profile; and
        causing control of at least one of braking, acceleration, and steering of the vehicle to generate movement based on the control actions.

13. The system of claim 12, wherein the parameters include a horizon length and a speed range associated with the highest regenerable elevation index, wherein the horizon length provides a distance ahead of the vehicle, and wherein the speed range provides a lower speed limit and an upper speed limit.

14. The system of claim 12, wherein the speed profile is generated based on vehicle dynamics for the vehicle and real-time inputs, wherein the vehicle dynamics include at least one of: a vehicle body model of the vehicle, a powertrain model of the vehicle, longitudinal dynamics associated with the vehicle, and an energy efficiency map for the vehicle, and wherein the real-time inputs include at least one of: a speed of the vehicle, an acceleration of the vehicle, a brake condition of the vehicle, a location of the vehicle, a direction of the vehicle, a pose of the vehicle, and an elevation of the vehicle.

15. The system of claim 12, wherein the speed profile includes a set of target speeds and a set of target positions associated with the set of target speeds, and wherein the control actions are generated based on a first target speed of the set of target speeds and a first target position of the set of target positions.

16. The system of claim 12, wherein the determining the parameters for the environment comprises:
providing a set of parameters, including the parameters for the environment, and metrics for the environment to a machine learning model, wherein the set of regenerable elevation indexes is determined based on the machine learning model, and wherein the machine learning model is trained based on simulations of vehicle performance in environments and fuel economy performance improvements determined based on the simulations.

17. A non-transitory computer-readable storage medium including instructions that, when executed by at least one processor of a computing system, cause the computing system to perform operations comprising:
based on a machine learning model, determining a set of regenerable elevation indexes for distances ahead of a vehicle in an environment and speed ranges for the vehicle;
selecting, by the computing system, a highest regenerable elevation index of the set of regenerable elevation indexes determined by the machine learning model;
determining parameters for the environment based on the highest regenerable elevation index of the set of regenerable elevation indexes;
generating a speed profile for the environment based on the parameters;
generating control actions for the vehicle in the environment based on the speed profile; and
causing control of at least one of braking, acceleration, and steering of the vehicle to generate movement based on the control actions.

18. The non-transitory computer-readable storage medium of claim 17, wherein the parameters include a horizon length and a speed range associated with the highest regenerable elevation index, wherein the horizon length provides a distance ahead of the vehicle, and wherein the speed range provides a lower speed limit and an upper speed limit.

19. The non-transitory computer-readable storage medium of claim 17, wherein the speed profile is generated based on vehicle dynamics for the vehicle and real-time inputs, wherein the vehicle dynamics include at least one of: a vehicle body model of the vehicle, a powertrain model of the vehicle, longitudinal dynamics associated with the vehicle, and an energy efficiency map for the vehicle, and wherein the real-time inputs include at least one of: a speed of the vehicle, an acceleration of the vehicle, a brake condition of the vehicle, a location of the vehicle, a direction of the vehicle, a pose of the vehicle, and an elevation of the vehicle.

20. The non-transitory computer-readable storage medium of claim 17, wherein the speed profile includes a set of target speeds and a set of target positions associated with the set of target speeds, and wherein the control actions are generated based on a first target speed of the set of target speeds and a first target position of the set of target positions.

* * * * *